United States Patent [19]

Boyce et al.

[11] Patent Number: 5,208,285
[45] Date of Patent: May 4, 1993

[54] VINYL ACETATE POLYMER WITH WET ADHESION

[75] Inventors: Clarke A. Boyce, Oakville; Rajeev Farwaha, Etobicoke; Brigitte H. Licht, Burlington; Martin Menard, Varennes, all of Canada

[73] Assignee: National Starch and Chemical Investment Holding Corporation, Wilmington, Del.

[21] Appl. No.: 749,613

[22] Filed: Aug. 16, 1991

Related U.S. Application Data

[63] Continuation of Ser. No. 480,432, Feb. 15, 1990, abandoned.

[30] Foreign Application Priority Data

Feb. 17, 1989 [CA] Canada ................................ 519428

[51] Int. Cl.$^5$ .............................................. C08L 31/04
[52] U.S. Cl. .................................. 524/516; 524/522; 524/523; 524/524
[58] Field of Search ............... 524/516, 808, 812, 522, 524/523, 524

[56] References Cited

U.S. PATENT DOCUMENTS 4,104,220 8/1978 Sims ................................ 260/29.6 R
4,219,454 8/1980 Iacoviello et al. .................. 524/812

FOREIGN PATENT DOCUMENTS 2045366 1/1992 Canada .
63-193959 8/1988 Japan .

Primary Examiner—Joseph L. Schofer
Assistant Examiner—Jeffrey T. Smith
Attorney, Agent, or Firm—Jane E. Gennaro; Ellen T. Dec

[57] ABSTRACT

Wet adhesion properties comparable or superior to all-acrylic latexes for vinyl acetate copolymers and other low cost polymers, such as EVA-vinyl chloride copolymers, is achieved by blending a minor proportion, usually about 5 to 15%, of a small particle size copolymer containing copolymerized wet adhesion monomer which is a cyclic ureido. Very low quantities of the wet adhesion monomer, less than 0.25 wt% of total monomers, only are required to achieve excellent results.

18 Claims, No Drawings

VINYL ACETATE POLYMER WITH WET ADHESION

This application is a continuation of application Ser. No. 07/480,432, filed Feb. 15, 1990, now abandoned.

The present invention relates to imparting wet adhesion properties to vinyl acetate copolymers and other low cost polymers employed in latex compositions particularly suited for semi-gloss, gloss and flat interior and exterior paint formulations.

Latex-based paints have captured a significant portion of the indoor and outdoor paint market as a result of the many advantages that such paints have over solvent-based products. The main advantage of latex-based paints include easy clean up and low odor and fast dry.

The term "wet adhesion" is used in the paint industry to describe the ability of a paint to retain its adhesive bond under wet conditions. Good wet adhesion is well known in solvent-based paints but water-based paints tend to lose adhesion in wet or humid conditions. This inherent deficiency limits extensive use of latex paints in humid environments. For example, paints intended for exteriors are frequently exposed to moisture, due to rain and humidity, while the same harsh conditions are encountered in interior paints used in bathrooms and kitchens. Further, resistance to washing and abrasive scrubbing also is an important requirement for painted surfaces which become soiled and must be washed and cleaned.

Two main types of emulsion polymer are employed in formulating latex paints, namely (1) the "acrylic copolymers" of alkyl esters of acrylic and methacrylic acid along with minor amounts of acrylic and methacrylic acid, and (2) the vinyl acetate polymers, comprising vinyl acetate in combination with minor amounts of softer acrylic monomers (sometimes termed "vinyl-acrylics"), or vinyl acetate in combination with ethylene and vinyl chloride. The acrylic emulsion polymers are mainly used in premium quality paints for excellent water resistance, desired levelling, film hardness and scrub resistance. The vinyl acetate polymers exhibit toughness and scrubability but poor water resistance. Vinyl acetate polymers tend to be much less expensive than the acrylic polymers.

Much effort has been devoted in recent years to improving the wet adhesion capabilities of latex-based paints. This effort has involved attempts to optimize various paint formulation parameters, such as pigment types, dispersant types, surfactants and coalescing agents. The most significant improvement in wet adhesion properties has been observed through functional modification of the polymer backbone of the latex binder, to incorporate amine, amide and acetoacetate functionalities.

In particular, cyclic ureido derivatives have been described in the patent literature as imparting wet adhesion properties and such components are described, for example, in U.S. Pat. Nos. 4,104,220, 4,111,877, 4,219,454, 4,319,032 and 4,599,417. Although this prior art describes improved wet adhesion properties for vinyl acetate polymers by copolymerizing with such cyclic ureido compounds, the cyclic ureido-containing functional monomers are very expensive and their inclusion results in a drastic and uneconomic increase in the cost of the vinyl acetate polymers.

U.S. Pat. No. 3,935,151 describes another approach to improving the wet adhesion properties of vinyl acetate polymers by blending into the vinyl acetate terpolymer, a copolymer which is a vinyl-acrylic, a vinyl chloride-acrylic or an all acrylic latex containing hydroxy methyl diacetone acrylamide (HMDAA).

The problem to which the present invention is directed is how to improve the wet adhesion properties of vinyl acetate polymers and other acrylic copolymers while retaining a competitive price advantage with respect to the all-acrylic latex.

It has now been surprisingly found that the wet adhesion properties of vinyl acetate polymers and other vinyl copolymers can be significantly and synergistically improved using the expensive cyclic ureido monomers but in sufficiently small quantity that a price advantage is achieved.

This result is achieved by blending a minor quantity of a first aqueous film-forming copolymer dispersion in which the copolymer particles have an average particle size from about 50 to about 200 nm and having a wet adhesion property imparting cyclic ureido monomer as a component thereof with a major quantity of an aqueous film-forming copolymer dispersion in which the copolymer particles have an average particle size from about 300 to about 700 nm. The cyclic ureido monomer is present in the composition in an amount of at least about 0.01 wt % of total monomers in the composition.

The cyclic ureido monomer produces a synergistic improvement in wet adhesion properties. The ability to employ such small quantities of the expensive cyclic ureido monomer enables satisfactory wet adhesion properties to be obtained very economically and such as to retain the price advantage of vinyl acetate copolymers as compared to acrylics and yet achieve comparable or superior wet adhesion properties.

Moreover, this improvement in wet adhesion is achievable at significantly lower levels of monomer than have been suggested in the prior art for blended systems, although higher levels may be employed.

In this regard, it is noted that in U.S. Pat. No. 3,935,151 discussed above, the minimum amount of HMDAA employed is 0.65% for an all-acrylic latex and 0.40% for a vinyl chloride-acrylic latex.

Accordingly, in one aspect, the present invention provides an aqueous coating composition having wet adhesion properties, comprising a blend of about 1 to about 50 wt %, preferably about 5 to about 15 wt %, of a first aqueous copolymer dispersion and about 99 to about 50 wt %, preferably about 95 to about 85 wt %, of a second aqueous copolymer dispersion.

The copolymer particles in the first aqueous copolymer dispersion have a particle size of from about 50 to about 200 nm, preferably about 100 to about 200 nm. The copolymer particles of the first aqueous copolymer may comprise any convenient film-forming copolymeric product formed for a polymerizable mixture of monomers, including a wet adhesion-imparting quantity of an unsaturated wet adhesion property imparting cyclic ureido monomer.

The copolymer particles may comprise the copolymeric product of (i) a major amount of an acrylic moiety selected from esters of acrylic and methacrylic acid, (ii), optionally, a minor amount of an unsaturated carboxylic acid selected from acrylic acid and methacrylic acid, and (iii) a small wet adhesive-imparting quantity of an unsaturated wet adhesion property imparting cyclic ureido monomer, preferably about 0.5 to about 3 wt %, more preferably less than 1.0 wt %, of the total monomers in the copolymer particles.

The copolymeric particles also may comprise the copolymeric product of (i) about 70 to about 95 wt % of vinyl acetate, (ii) optionally, up to about 1 wt % of an unsaturated carboxylic acid, (iii) a small wet adhesion property imparting quantity of an unsaturated wet adhesion property imparting cyclic ureido monomer, preferably about 0.5 to about 3 wt % of the total monomers in the copolymer particles, and (iv) the balance by weight of a monomer selected from esters of acrylic acid and vinyl versatate.

The copolymeric particles further may comprise the copolymeric product of (i) about 15 to about 55 wt % of styrene, (ii) a small wet adhesion imparting quantity of an unsaturated wet adhesion property imparting cyclic ureido monomer, and (iii) the balance by weight of at least one acrylic moiety selected from esters of acrylic acid. These copolymer particles may possess core-shell morphology.

The cyclic ureido monomer preferably is present in the composition in an amount of from about 0.01 to about 0.25 wt %, more preferably about 0.04 to about 0.1 wt %, of total monomers in the composition. While it is generally preferred to employ only small quantities of cyclic ureido monomer, in view of the cost thereof and the fact that the advantageous wet adhesion properties are obtained using such small quantities, larger quantities may be employed, if desired. Generally no more than about 1 wt % of cyclic ureido monomer is employed, based on total weight of monomers.

While not wishing to be bound by any theory to explain the excellent and synergistic wet adhesion properties obtained, it is believed to result mainly from the particle size ranges of the respective resin particles in the blend. The packing of small particle size copolymer particles with wet adhesion monomer into the interparticle spaces of the larger size particles imparts wet adhesion characteristics to polymer films formed from the blend using a low overall quantity of cyclic ureido monomer.

The cyclic ureido monomer employed herein is selected from among such monomers known to impart wet adhesion properties. It is preferred, however, to employ the cyclic alkylene ureas having hydroxyl and amine functionalities, as fully described in U.S. Pat. No. 4,319,032.

As discussed in that patent, the compounds have the general formula:

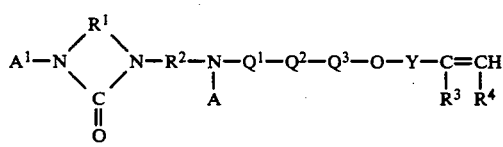

where $R^1$ is alkylene having 2 to 3 carbon atoms, and preferably $R^1$ is $C_2H_4$;

$R^2$ is alkylene having 2 to about 10, preferably 2 to 4, carbon atoms, and most preferably, $R^2$ is $C_2H_4$;

$R^3$ is H or $CH_3$, preferably H;

$R^4$ is H or $CH_3$ and may be the same as or different from $R^3$, and preferably $R^4$ is H;

$Q^1$ is $(R^5\text{-}O)_m$ where m is zero or an integer from 1 to about 100, preferably zero or 1 to about 75, and most preferably zero, and $R^5$ is a linear or branched alkylene, alkoxyalkylene, cycloalkylene, cycloalkoxyalkylene, arylalkylene or aryloxyalkylene residue having 2 to about 20, preferably 2 to 6, carbon atoms;

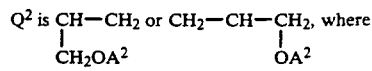

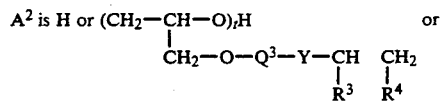

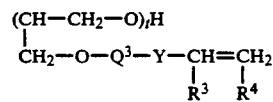

where t is zero or an integer from 1 to 10, and preferably $Q^2$ is

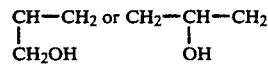

$Q^3$ is $(O\text{-}R^6)n$ where n is zero or an integer from 1 to about 100, preferably zero or from 1 to about 75, and most preferably n is zero, and may be the same as or different from m, and $R^6$ is a linear or branched alkylene, alkoxyalkylene, cycloalkylene, cycloalkoxyalkylene, arylalkylene or aryloxyalkylene residue having 2 to about 20, preferably 2 to 6 carbon atoms, and may be the same as or different from $R^5$;

Y is $CH_2$ or

preferably $CH_2$;

A is H, $Q^4H$ or

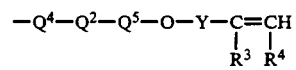

where $Q^4$ is $(R^7\text{-}O)_p$ where p is zero or an integer 1 to about 100, preferably 1 to about 75, and may be the same as or different from m and n and preferably is the same as m, and $R^7$ is a linear or branched alkylene, alkoxyalkylene, cycloalkylene, cycloalkoxyalkylene, arylalkylene or aryloxyalkylene residue having 2 to about 20, preferably 2 to 6 carbon atoms, and may be the same as or different from $R^5$ and $R^6$ and preferably the same as $R^5$;

$Q^5$ is $(O\text{-}R^8)_q$ where q is zero or an integer from 1 to about 100, preferably 1 to about 75, and may be the same as or different from m, n and p, and preferably is the same as n, and $R^8$ is a linear or branched alkylene, alkoxyalkylene, cycloalkylene, cycloalkoxyalkylene, arylalkylene or aryloxyalkylene residue having 2 to about 20, preferably 2 to 6 carbon atoms, and may be the same as or different from $R^5$, $R^6$ and $R^7$, and preferably is the same as $R^6$; and $Q^2$, Y, $R^3$ and $R^4$ are as defined above; and $A^1$ is H, $Q^6H$,

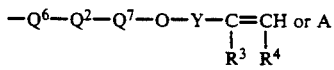

where $Q^6$ is $(R^9\text{-O})r$ where r is zero or an integer from 1 to about 100, preferably 1 to about 75, and may be the same as or different from m, n, p and q and preferably is the same as m, and $R^9$ is a linear or branched alkylene, alkoxyalkylene, cycloalkylene, cycloalkoxyalkylene, arylalkylene or aryloxyalkylene residue having 2 to about 20 preferably 2 to 6, carbon atoms, and may be the same as or different from $R^5$, $R^6$, $R^7$ and $R^8$, and preferably is the same as $R^5$;

$Q^7$ is $(O\text{-}R^{10})_s$ where s is zero or an integer from 1 to about 100, preferably 1 to about 75 and may be the same as or different from m, n, p, q and r, and preferably is the same as n, and R is a linear or branched alkylene, alkoxyalkylene, cycloalkylene, cycloalkoxyalkylene, arylalkylene or aryloxyalkylene residue having 2 to about 20, preferably 2 to 6 carbon atoms, and may be the same as or different from $R^5$, $R^6$, $R^7$, $R^8$ and $R^9$ and preferably is the same as $R^6$; and $Q^2$, Y, $R^3$, $R^4$ and A are as defined above.

Preferred compounds of this general class for utilization herein have the formula:

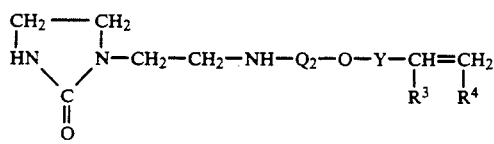

Most preferably, the compound employed as the wet adhesion property imparting monomer has the formula:

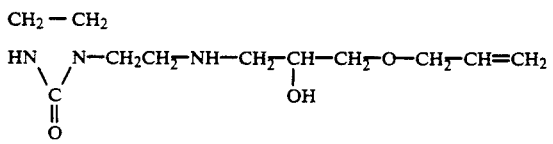

This compound is sold commercially from Alcolac Inc., of Baltimore, Md., U.S.A. under the trademark Sipomer WAM.

The cyclic ureido compound may be copolymerized with acrylic unsaturated functional monomer to form an all-acrylic component of the composition. Suitable acrylic unsaturated functional monomers commonly-used to produce all-acrylic emulsions include ester of methacrylic acid, including methyl methacrylate and butyl methacrylate, and esters of acrylic acid, including ethyl acrylate, butyl acrylate and 2-ethylhexyl acrylate. Such esters of methacrylic acid and acrylic acid comprise a major proportion of copolymerized monomers. It is preferred that the concentration of esters of methacrylic acid in the all-acrylic resin be about 45 to about 60 wt % of the copolymerized monomers.

The proportions of the respective acrylic monomers usually are balanced to provide a minimum film forming temperature close to or below room temperature, as is well known in the art of latex paint.

A minor proportion of an unsaturated carboxylic acid monomer usually acrylic acid or methacrylic acid, preferably about 0.5 to about 2.0 wt % based on the ester monomers optionally may be included. Most functional carboxylic acid monomers are highly water soluble, which makes it difficult to incorporate them at the polymer particle/water interface. These functional monomers can be found in one or more of several loci in the latex system.

The introduction of carboxylic groups on the polymer chain of carboxylated latices has been found to result in the improvement of several significant properties such as colloidal stability, mechanical and freeze-thaw stability, and rheology.

The distribution of acid groups in the system, namely the relative distribution of acid in the serum phase to that on the latex surface, to that buried in the latex core, is strongly dependant on the polymerization conditions and the nature of copolymerizable function carboxylic acid monomer.

The cyclic ureido monomer may also be copolymerized with the components of a vinyl acetate copolymer, as described below, or the components of a styrene acrylic copolymer. Such copolymers comprise styrene and acrylic acid ester monomers, usually butyl acrylate and methyl methacrylate, and may be provided in a core-shell morphology.

The copolymer particles in the second aqueous copolymer dispersion have a particle size of about 300 to about 700 nm, preferably about 400 to about 600 nm. The copolymer particles of the second aqueous copolymer may comprise any convenient film-forming copolymeric product formed from a polymerizable mixture of monomers.

The copolymer particles may comprise the polymeric product of (i) about 70 to about 95 wt % of vinyl acetate, (ii) optionally, up to about 1 wt % of an unsaturated carboxylic acid, (iii) optionally, up to about 2 wt % of sodium vinyl sulfonate, and (iv) the balance by weight of an acrylic moiety selected from esters of acrylic acid.

Such vinyl acetate copolymer may contain polymerized therein preferably about 80 to about 95 parts vinyl acetate with the remaining acrylic acid ester monomers, usually butyl acrylate or 2-ethyl hexyl acrylate, totalling 100 parts of the total monomer feed. A preferred level of carboxylic acid monomer, when present, which may be acrylic acid or a monoalkyl maleate or sodium vinyl sulfonate, is about 0.5 to about 1%. Higher levels of acid monomers increase the water sensitivity of the final product, and hence are undesired.

The copolymeric particles in the second aqueous copolymers dispersion also may comprise the copolymeric product of (i) about 5 to about 25 wt % of ethylene, (ii) about 50 to about 80 wt % of vinyl acetate, (iii) optionally, about 0.5 to about 2 wt % of unsaturated carboxylic acid or sodium vinyl sulfonate, and (iv) the balance by weight of vinyl chloride.

In general the copolymeric particles in the second aqueous copolymer dispersion may comprise at least about 50 wt % of vinyl acetate copolymerized with at least one other monomer selected from ethylene, acrylate esters, vinyl chloride and vinyl versatate, having a glass transition temperature of about $-5°$ C. to about $+25°$ C.

Polymeric colloidal stabilizers, such as carboxymethyl cellulose, hydroxy methyl, ethyl or propyl cellulose also may be used to prevent latex particles from coagulation under mechanical stress. These stabilizers are preferably employed in amounts from about 0.4 to about 0.8 parts per hundred parts of monomer. The wet adhesion monomer is not introduced during the synthesis of vinyl acetate copolymer latices.

The solid content of the copolymer dispersions employed in the present invention usually ranges from about 40% by weight to as high as about 70%.

Both the copolymer dispersions employed in the present invention may be formed by conventional free-radical-initiated polymerization procedures in the presence of surfactants to protect the copolymer particles from agglomeration and buffers to maintain the desired pH during polymerization.

A commonly-employed polymerization procedure employs the following steps:

1. Preparing a monomer pre-emulsion by
   a) feeding a surfactant mix comprising deionized water, anionic and non-ionic surfactants into a pre-emulsification tank at ambient temperature with good agitation,
   b) adding monomer charge.
2. Preparing a seed latex by adding required monomer mix and surfactant.
3. Adding wet adhesion monomer after seed formation or emulsifying as in 1(a), depending on which polymer particles are being produced.
4. Feeding the pre-emulsion prepared to the seed latex over a period of 3-5 hours.

The choice of the anionic surfactants can be made from salts of $C_{12}$ to $C_{18}$ carboxylic acid alkyl and/or aryl sulfates and sulphonates, ethoxylated sulfates, sulphonates and succinates.

Typical non-ionic surfactants include ethoxylated nonyl and octyl phenols, for example, those sold under the trademarks Rexol 25/407 and Rexol 45/407, by Hart Chemicals Limited, Guelph, Ontario, Canada.

Free radical initiators used in the polymerization procedure can be thermal or redox. Thermal initiators are compounds that undergo homolytic cleavage upon heating to yield free radicals. The most widely used thermal initiator in emulsion polymerization is the peroxydiesulfate ion, added as the potassium, sodium, or ammonium salt. At temperatures below 70° C., the decomposition rate is too low to be of any practical use.

Redox initiation systems are based on the fact that the rate of persulfate decomposition can be accelerated by a reducing agent. In addition to the reducing agent, there is often also present a low concentration of metal ion (e.g., $FeSo_4.7H_2O$) that acts as an activator. In the redox reaction, the temperature can be lowered and products having smaller particle size, higher molecular weight, and viscosity as compared to thermal initiation are obtained.

Redox initiation is preferred in the present invention in order to achieve the desired properties.

The invention is illustrated by the following Examples:

EXAMPLES

A series of blends were prepared of vinyl acetate terpolymers commercially-available from Nacan Products Limited of Brampton, Ontario, Canada, the applicants herein and from Vinamul Ltd. (Carshalton, England), and the wet adhesion properties of the blends were tested in order to examine the synergistic effect of blending.

The amount and type of wet adhesion monomer was varied in order to determine the optimum level and type of wet adhesion monomer required in the blend to achieve maximum performance.

The compositions were incorporated into standard gloss, semi-gloss and flat paint coating compositions. The wet adhesion evaluations were performed on films produced from the paint compositions.

A standard test procedure was devised for the evaluation. In this test procedure, a leneta scrub panel is prepared by making a drawdown of a standard semi-gloss alkyd base. (This base is chosen as being the most difficult test for wet adhesion). The alkyd coating is drawn down using a 3-mil base. The panels are aged at least a week at room temperature. The test latex is drawn on aged alkyd surface using a 3-mil bird applicator and allowed to dry for 48 hours. The following abrasive scrub resistance test procedure then is followed:

1) Tape test chart to glass panel and put into scrub machine;
2) Immerse brush in warm water for 30 minutes to condition before tests;
3) Weight out in ten (10) separate containers 8 gms. each of Ajax;
4) Put brush in holder and then over top of chart and add 200 gm of warm water;
5) Start machine and run for 400 strokes;
6) Then add 8 gm dry Ajax under brush (stop machine), then run 100 strokes more; and
7) Repeat number 6 every 100 strokes until failure, i.e., when paint strips from the alkyd. The test results are then averaged.

EXAMPLE I

This Example illustrates the preparation of a methyl methacrylate butyl acrylate latex which contains one part per hundred monomer (pphm) Sipomer WAM as the wet adhesion promoting monomer.

A 10L stainless steel reactor was used as the primary vessel, and to this vessel were charged:

| Seed Formation | |
| --- | --- |
| Compound | Grams |
| Deionized water | 2200 |
| Rexol 45/307 (70%) | 76.56 |
| Sodium metabisulfite | 0.72 |
| At 50° C. add: | |
| Methyl methacrylate (MMA) | 83.12 |
| Butyl acrylate (BA) | 60.1 |
| Methacrylic acid (MA) | 3.5 |
| After 5 minutes add: | |
| Ammonium persulfate | 1.4 |
| Water | 9.0 |

Mild agitation was effected during seed formation using a single turbine stirrer with the reaction contents heated to 50° C.

A monomer pre-emulsion was formed in secondary vessel I comprising:

| SECONDARY VESSEL I | |
| --- | --- |
| Compound | Grams |
| H₂O | 925.7 |
| Rexol 45/307 (70%) | 187.2 |
| Add to it monomer mix of: | |
| MMA | 1614.2 |
| BA | 1161.56 |
| MAA | 58.18 |
| Sipomer WAM | 29.8 |

In secondary vessel II there were charged:

| SECONDARY VESSEL II | |
|---|---|
| Compound | Grams |
| Ammonium persulfate | 12.6 |
| Water | 271 |

In secondary vessel III there were charged:

| SECONDARY VESSEL III | |
|---|---|
| Compound | Grams |
| Sodium metabisulfite | 5.4 |
| $H_2O$ | 271 |

The contents of secondary vessels I, II and III were added to the primary vessel over a period of 5 hours. At the completion of polymerization, the pH of the emulsion was adjusted to 8.0 by adding 26% ammonium hydroxide solution.

The particle size of the emulsions was determined by a BI-90 particle size analyzer (Brookhaven Instruments). The resultant latex (Acrylic A) had a solid content of 46%, the average particle diameter was 105 nm and the viscosity was equal to 40 cps.

Another latex was prepared according to the above procedure, except that 0.5 parts per hundred monomer of Sipomer WAM (14.9g) was added to the secondary vessel I. The resulting latex (Acrylic B) had a solid content of 46% and an average particle size of 103 nm.

A third emulsion wherein no Sipomer WAM was introduced in secondary vessel I was synthesized (Acrylic C). The resulting emulsion had solid content of 46% and an average particle size of 110 nm.

EXAMPLE II

This Example illustrates the preparation of additional all-acrylic latexes.

All acrylic Latex D, E and F also were prepared following the procedure in Example I wherein one part per hundred monomer of Sipomer WAM was introduced on the polymer backbone. The variations were introduced in the respective surfactant systems. The final emulsion had non-volatile contents of approximately 47%. These emulsions exhibited the following physical parameters:

| | Acrylic D | Acrylic E | Acrylic F |
|---|---|---|---|
| Particle size (nm) | 150 | 193 | 164 |
| Viscosity (cps) | 40 | 100 | 100 |
| pH | 8.0 | 5.25 | 6.4 |

EXAMPLE III

This Example provides physical properties of the vinyl acetate terpolymers tested.

Nacan's three commercial vinyl-acrylic emulsions, stabilized with hydroxyethyl cellulose and non-ionic surfactant and containing no wet adhesion monomer, have the following product characteristics:

| (a) | 68-4567 | | (b) | 68-3456 |
|---|---|---|---|---|
| | % Solids | 55.0 | | 55.0 |
| | Viscosity (cps) | 1000-2000 | | 1500-2000 |
| | pH | 5-6 | | 5-6 |
| | Particle Size (nm) | 450 | | 500-600 |
| (c) | 68-2300 | | | |
| | % Solids | 55.0 | | |
| | Viscosity (cps) | 4000 | | |
| | pH | 5-6 | | |
| | Particle Size (nm) | 350 | | |

EXAMPLE IV

This Example sets forth the paint formulations into which blends of the compositions of Examples I to III were incorporated.

| | Compounds | Grams |
|---|---|---|
| 1) | SEMI-GLOSS PAINT SCREENING FORMULA | |
| | Ethylene Glycol | 81 |
| | Colloid 226-35 (1) | 7.5 |
| | Drew L-475 (2) | 3.0 |
| | Water | 30 |
| | Titanox 2020 (3) | 300 |
| | Snowhite 10-1 (4) | 50 |
| | Disperse 5-6 Hegman (5) and add: | |
| | Water | 265 |
| | Methocel J5MS (6) | 2 |
| | Resin | 530 |
| | Rexol 25 9 (7) | 4.0 |
| | Texanol (8) | 10.0 |
| | AMP-95 (9) | 3.0 |
| | UCAR SCT-275 (10) | 25.0 |
| | Kathon LX (11) | 3.0 |
| | Drew L-475 | 6.0 |
| 2) | SATIN PAINT SCREENING FORMULA | |
| | Water | 150 |
| | Kathon LX | 3.0 |
| | Colloid 643 (12) | 3.0 |
| | Colloid 226-35 | 8.0 |
| | Ethylene glycol | 40.0 |
| | Titanox 2020 | 300 |
| | Omyacarb F (13) | 150 |
| | Insil A-10 (14) | 40 |
| | Methocel J5MS | 3.0 |
| | $H_2O$ | 220.0 |
| | Disperse 3 Hegman and add: | |
| | Texanol | 8 |
| | $H_2O$ | 220 |
| | Resin | 400 |
| | Rexol 25/9 | 3.0 |
| | AMP-95 | 3.0 |
| | Colloid 643 | 5.0 |
| | UCAR SCT-275 | 25.0 |

Notes:
(1) Colloid 226-35 is a non foaming, Water-soluble anionic dispersant containing 35% of active, and having a pH of 7.5 and specific gravity of 1.23.
(2) Drew L-475 is a defoamer prepared from a blend of mineral oils and silica derivatives containing 100% of active material.
(3) Titanox 2020 (or Tioxide HD6X) is rutile titanium dioxide.
(4) Snowhite 10-1 is calcium carbonate having the properties:
CaCO3 92.5%
dry brightness - 95.5
Specific gravity - 2.65
less than 10 microns - 90%
mean particle size - 3 microns
Hegman grind - 6.5
oil absorption - 16
(5) Disperse 5-6 Hegman is a grind gauge used by the paint industry.
(6) Methocel J5MS is hydroxy propyl cellulose.
(7) Rexol 25/9 is an ethoxylated nonyl phenol surfactant containing 9 to 10 moles of ethylene oxide.
(8) Texanol is 2,2, 4-Trimethylpentanediol-1,3, monoisobutyrate and used as coalescing agent.
(9) AMP-25 is 2-amino-2-methyl-1-propanol.
(10) UCAR SCT-275 is a non-ionic water-soluble polyether-polyurethane thickener.
(11) Kathon LX is a microbiocide having, as active ingredients, 5-chlor-2-methyl-4-isothiazolin-3-one and 2-methyl-4-isothiazolin-3-one and containing 14% active ingredients.
(12) Colloid 643 is a defoamer.
(13) Omyacarb F is a fine grade calcium carbonate.
(14) Insil A-10 is a fine grade silica pigment.

EXAMPLE V

This Example provides the test results for paint tests.

The standard paint formulations for semi-gloss and satin (flat) applications set forth in Example IV, were used to compare the respective emulsions and blends prepared from the materials described in Examples I to III. The paint compositions then were tested for wet adhesion, lava scrubs, gloss, levelling by brush out, paint viscosity, color acceptance and freeze-thaw stabilities.

The acrylic lattices obtained from Examples I and II were blended with Nacan's commercial vinyl-acrylic Resins 68-4567, 68-3456 and 68-2300 respectively (see Example III) in various weight ratios. The wet adhesion paint properties were evaluated and recorded in Table I which follows:

TABLE I

| Emulsion Blend No. | a Vinyl-Acrylic/ b All Acrylic Polymer Ratio | % Sipomer WAM based on monomers in blend | Wet adhesion scrubs (no. of strokes to failure) | |
|---|---|---|---|---|
| | | | SEMIGLOSS | SATIN |
| 1. | 68-4567/All Acrylic (A) | | | |
| | 100/0 | 0.00 | 286 | |
| | 95/5 | 0.044 | 711 | |
| | 90/10 | 0.09 | 1485 | |
| | 85/15 | 0.13 | 1808 | |
| | 75/25 | 0.21 | 1871 | |
| | 0/100 | 1.0 | 1875 | |
| 2. | 68 4567/All Acrylic (B) | | | |
| | 90/10 | 0.04 | 679 | |
| | 80/20 | 0.09 | 1262 | |
| | 0/100 | 0.50 | 1709 | |
| 3. | 68-4567/All Acrylic (C) | | | |
| | 95/5 | — | 660 | |
| | 90/10 | — | 623 | |
| | 75/25 | — | 836 | |
| | 0/100 | — | 1453 | |
| 4. | 68-4567/All Acrylic (D) | | | |
| | 95/5 | 0.044 | 1300 | 1006 |
| | 90/10 | 0.09 | 1850 | 972 |
| | 85/15 | 0.13 | 2190 | 1108 |
| | 75/25 | 0.21 | 2134 | 980 |
| | 0/100 | 1.0 | 1840 | 900 |
| 5. | 68-4567/All Acrylic (E) | | | |
| | 95/5 | 0.044 | 1200 | |
| | 90/10 | 0.09 | 1450 | |
| | 85/15 | 0.13 | 1478 | |
| | 0/100 | 1.06 | 3332 | |
| 6. | 68-4567/All Acrylic (F) | | | |
| | 97.5/2.5 | 0.02 | 656 | |
| | 95/5 | 0.044 | 1387 | |
| | 90/10 | 0.09 | 1672 | |
| | 85/15 | 0.13 | 1534 | |
| | 0/100 | 1.0 | 3704 | |
| 7. | 68-3456/All Acrylic (D) | | | |
| | 100/0 | — | 300 | |
| | 95/5 | 0.044 | 1602 | |
| | 90/10 | 0.09 | 1822 | |
| | 75/25 | 0.21 | 2140 | |
| | 50/50 | 0.44 | 1800 | |
| 8. | 68-2300/All Acrylic (D) | | | |
| | 100/0 | — | 410 | |
| | 90/10 | 0.09 | 1383 | |
| | 85/15 | 0.13 | 1275 | | a - Percent solids 55.0
b - At 46 to 47 percent solids

As may be seen from the results shown in Table I:
1) Blending acrylic latex containing wet adhesion monomer (Sipomer WAM) with vinyl acetate terpolymer exhibited a synergistic effect in improving wet adhesion capability of vinyl acetate copolymer.
2) The wet adhesion performance of blend comparable to all acrylic latex was achieved by blending with 5 to 15% of all acrylic latex.
3) Blending acrylic latex (c) wherein no wet adhesion monomer "Sipomer WAM" was interpolymerized, no significant improvement in wet adhesion capability of vinyl acetate terpolymer was seen. (See Table I, blend 3).
4) Using acrylic (B) wherein 0.5 pphm of Sipomer WAM was copolymerized on the polymer backbone (Blend 2), twice the amount of acrylic was required to achieve comparable performance to blend 1.

EXAMPLE VI

An all-acrylic latex containing 3.2 pphm of hydroxymethyl diacetone acrylamide (HMDAA) was prepared following the polymerization procedure described in Example VII of U.S. Pat. No. 3,935,151. The all-acrylic emulsion containing HMDAA and its blends with vinyl acetate terpolymer were formulated into semi-gloss paint formulation using the previously described procedure in Example IV. The compounded paints were subjected to wet adhesion scrub tests as described above.

The results obtained are summarized in the following Table II:

TABLE II

| Emulsion Blend No. | a Vinyl-acrylic (68-4567)/all-acrylic emulsion polymer ratio | % HMDAA based on total monomer in blend | Wet Adhesion scrubs |
|---|---|---|---|
| 1. | 100/0 | 0.00 | 260 |
| 2. | 90/10 | 0.32 | 1046 |
| 3. | 70/30 | 0.94 | 1200 |
| 4. | 0/100 | 3.2 | 1806 |

As may be seen from comparing results in Table I of Example IV with those in Table II of Example VI wherein wet adhesion monomer Sipomer WAM and HMDAA were respectively interpolymerized in acrylic emulsion polymer:
1) A much lower level of wet adhesion promoter Sipomer WAM (1 pphm) as compared to HMDAA (3.2 pphm) was required to achieve respectable wet adhesion in all-acrylic emulsion.
2) In vinyl-acetate all-acrylic blends of Example IV a small amount of Sipomer WAM was sufficient to confer wet adhesion to the blend in comparison to the higher levels of HMDAA required in Example VI.
3) The level of all-acrylic resin with wet adhesion monomer in vinyl acetate all-acrylic blends in Example IV was lower than in Example VI. The amount of acrylic resin and adhesion promoting monomer required for wet adhesion in the blend has a direct impact on increasing the cost of blended latex.

EXAMPLE VII

This Example illustrates the preparation of vinyl acrylic latex having wet adhesion capabilities.

A vinyl acetate-butyl acrylate (80/20) copolymer latex containing one part per hundred monomer (Pphm) of Sipomer WAM was synthesized employed the general emulsion polymerization procedure shown in Example I. The resulting emulsion G exhibited the following physical properties: % Solids 50.0; Particle Size (nm) 192±2; Viscosity (cps) 400; pH 4.3.

EXAMPLE VIII

The Example illustrates the preparation of styrene-acrylic latex having wet adhesion capabilities.

A styrene acrylate latex with core-shell morphology containing Sipomer WAM in the shell following the general polymerization procedure obtained in Example I was synthesized. The latex particles were made by two step procedure, i.e. the core was made by polymerizing styrene-butyl acrylate followed by overpolymerization with a monomer feed of methyl methacrylate-butyl acrylate containing 1 Pphm of Sipomer WAM to furnish core-shell morphology to the polymer particles. The resulting latex H had the following physical properties: % solids 50.0; particle size (nm) 131; grits (200 M) 0.001; Viscosity (cps) 246.

EXAMPLE IX

This Example provides physical properties of the ethylene-vinyl acetate-vinyl chloride (EVA-VCl) terpolymers tested.

Three commercial EVA-VCl polymer emulsions of Vinamul Ltd. have the following product characteristics:

|  | a) Vinamul 3459 | b) Vinamul 3650 | c) Vinamul 3469 |
|---|---|---|---|
| % Solids | 51–52 | 51–52 | 55.0 |
| Viscosity (cps) | 3000–4000 | 2000–4000 | 2000–4000 |
| pH | 4–6 | 5–6 | 4–6 |
| Particle Size(nm) | 450 | 650 | 400–600 |

EXAMPLE X

This Example provides the test results for wet adhesion paint tests.

The vinyl acrylic latex having wet adhesion capabilities obtained from Example VII was blended with NA-CAN's commercial vinyl-acrylic 68-4567 and Vinamul's 3650 respectively, in the weight ratio shown in Table III below and formulated in a standard paint formulation for semi-gloss application and tested for wet adhesion.

TABLE III

| 68-4567/vinyl acrylic G with wet adhesion polymer ratio | % Sipomer WAM based on monomer in blend | Wet adhesion scrubs (no of strokes to failure) |
|---|---|---|
| 100/0 | 0 | 260 |
| 85/15 | 0.13 | 1900 |
| 0/100 | 1.0 | 1068 |
| Vinamul 3650/vinyl acrylic G |  |  |
| 100/0 | 0 | 60 |
| 85/15 | 0.15 | 940 |
| 0/100 | 1.0 | 1068 |

As may be seen from the results shown on Table III, blending vinyl acrylic latex containing wet adhesion monomer (Sipomer WAM) with vinyl acrylic terpolymer and vinyl acetate-ethylene-vinyl chloride pressure polymer emulsion exhibits a synergistic effect in improving the wet adhesion capabilities of vinyl acetate copolymer and E-VA-VCl latex respectively.

EXAMPLE XI

The Example illustrates the use of all acrylic emulsion D containing wet adhesion monomer into E-VA-VCl pressure polymer latex. The blends were formulated into a semi-gloss paint formulation using the previously described procedure in Example IV and tested for wet adhesion. The results are set forth in Table IV below:

TABLE IV

| Emulsion Blend # | E-VA-VCl/All acrylic emulsion polymer ratio | % Sipomer WAM in blend | Wet Adhesion scrubs (no of strokes to failure) |
|---|---|---|---|
| 1. | Vinamul 3650/all acrylic D |  |  |
|  | 100/0 | 0 | 60 |
|  | 85/15 | 0.15 | 1124 |
|  | 0/100 | 1.0 | 1840 |
| 2. | Vinamul 3459/all acrylic D |  |  |
|  | 100/0 |  | 106 |
|  | 85/15 | 0.15 | 1904 |
|  | 0/100 | 1.0 | 1840 |
| 3. | Vinamul 3469/all acrylic D |  |  |
|  | 100/0 | 0 | 122 |

TABLE IV-continued

| Emulsion Blend # | E-VA-VCl/All acrylic emulsion polymer ratio | % Sipomer WAM in blend | Wet Adhesion scrubs (no of strokes to failure) |
|---|---|---|---|
| | 85/15 | 0.13 | 1352 |
| | 0/100 | 1.0 | 1840 |

The results set forth in Table IV show that blending acrylic emulsion D wherein Sipomer WAM was interpolymerized into ethylene-vinyl acetate-vinyl chloride terpolymer with no wet adhesion properties results in building wet adhesion capabilities into E-VA-VCl pressure polymers.

EXAMPLE VII

This Example illustrates the use of styrene acrylic latex H having excellent wet adhesion capabilities to build wet adhesion into vinyl acetate terpolymers and ethylene-vinyl acetate-vinyl chloride pressure polymers respectively. The blends were formulated in a semigloss paint formulation and tested for wet adhesion. The results are set forth in Table V below:

TABLE V

| Emulsion Blend No. | | % Sipomer WAM in blend | Wet Adhesion scrubs (no of strokes to failure) |
|---|---|---|---|
| 1. | 68-4567/styrene acrylic H wt ratio | | |
| | 100/0 | 0 | 260 |
| | 85/15 | 0.13 | 1882 |
| | 0/100 | 1.0 | 4356 |
| 2. | Vinamul 3650/ styrene-acrylic H wt ratio | | |
| | 100/0 | 0 | 60 |
| | 85/15 | 0.15 | 1400 |
| | 0/100 | 1.0 | 4356 |

The results in the above Table V demonstrate that wet adhesion capability to vinyl acetate terpolymer and ethylene-vinyl acetate-vinyl chloride pressure polymers can be significantly improved by blending with styrene acrylic emulsion wherein Sipomer WAM was interpolymerized.

In summary of this disclosure, the present invention provides a novel and cost effective way of providing improved wet-adhesion properties to vinyl acetate copolymers by blending into the vinyl acetate polymer emulsion, a minor amount of an all-acrylic emulsion or other emulsions having copolymerized therein a small quantity of a cyclic ureido monomer having wet adhesion-imparting properties. Modifications are possible within the scope of this invention.

What is claimed is:

1. An aqueous coating composition having wet adhesion properties, which comprises a blend of two different aqueous film-forming copolymer dispersions in which the copolymer particles have different average particle size ranges and consisting essentially of:
   (a) about 1 to about 50 wt % of a first of said two different film-forming copolymer dispersions wherein the copolymer particles have an average particle size of from about 50 to about 200 nm, said copolymer particles of said first film-forming copolymer dispersion comprising the copolymeric product formed by copolymerization of a first copolymerizable mixture of monomers which includes a wet adhesion-imparting quantity of an unsaturated wet adhesion property imparting cyclic ureido monomer, and
   (b) about 99 to about 50 wt % of a second of said two different film-forming copolymer dispersions wherein the copolymer particles have an average particle size of about 300 to about 700 nm, said copolymer particles of said second film-forming copolymer dispersion comprising the copolymeric product formed by copolymerization of a second copolymerizable mixture of monomers from which said unsaturated wet adhesion property imparting cyclic ureido monomer is absent,
   wherein said cyclic ureido monomer is present in said blend, in copolymerized form and only in the first polymer dispersion, in an amount of about 0.01 to about 0.25 wt % of total monomer present in polymerized form in said first and second film-forming copolymer dispersions in said blend.

2. A composition as claimed in claim 1 comprising about 1 to about 20 wt % of the first film-forming copolymer and about 99 to about 80 wt % of the second film-forming copolymer.

3. A composition as claimed in claim 2 comprising about 5 to about 15 wt % of the first film-forming copolymer and about 95 to 85 wt % of the second film-forming copolymer.

4. A composition as claimed in claim 1, wherein said first copolymer comprises:
   (i) a major amount of an acrylic moiety selected from esters of acrylic and methacrylic acid,
   (ii) optionally, a minor amount of an unsaturated carboxylic acid selected from acrylic acid and methacrylic acid, and
   (iii) a wet adhesion-imparting quantity of an unsaturated wet adhesion property imparting cyclic ureido monomer.

5. A composition as claimed in claim 1, wherein said first copolymer comprises:
   (i) about 70 to about 95 wt % of vinyl acetate,
   (ii) from 0 to about 1 wt % of an unsaturated carboxylic acid,
   (iii) a wet adhesion-imparting quantity of an unsaturated wet adhesion property imparting cyclic ureido monomer, and
   (iv) the balance by weight of an acrylic moiety selected from esters of acrylic acid.

6. A composition as claimed in claim 1, wherein said first copolymer comprises the copolymeric product of:
   (i) about 15 to about 55 wt % of styrene,
   (ii) a wet adhesion imparting quantity of an unsaturated wet adhesion property imparting cyclic ureido monomer, and
   (iii) the balance by weight of at least one acrylic moiety selected from esters of acrylic acid.

7. A composition as claimed in claim 1, wherein said second copolymer has a glass transition temperature of about −5° C. to about +25° C. and comprises the copolymer product of at least about 50% of vinyl acetate and at least one monomer selected from the group consisting of ethylene, acrylate esters, vinyl chloride and vinyl versatate.

8. A composition as claimed in claim 1, wherein said second copolymer comprises:
   (i) about 70 to about 95 wt % of vinyl acetate, (ii) from 0 to about 1 wt % of an unsaturated carboxylic acid, and
(iii) from 0 to about 2 wt % of sodium vinyl sulfonate, and
(iv) the balance, by weight, of an acrylic moiety selected from esters of acrylic acid.

9. A composition as claimed in claim 1, wherein said second copolymer comprises:
   (i) about 5 to about 25 wt % of ethylene,
   (ii) about 50 to about 80 wt % of vinyl acetate,
   (iii) optionally, about 0.5 to about 2 wt % of unsaturated carboxylic acid, sodium vinyl sulfonate, trialkoxy silane or epoxy trialkoxy silane, and
   (iv) the balance by weight of vinyl chloride.

10. A composition as claimed in claim 1, wherein the first copolymer particles have a particle size from about 100 to about 200 nm and the second copolymer particles have a particle size from about 400 to about 600 nm.

11. A composition as claimed in claim 1, wherein said cyclic ureido monomer is employed in an amount of about 0.5 to about 3 wt % of the total monomers in said first copolymer particles.

12. A composition as claimed in claim 1, wherein said cyclic ureido monomer is present in said composition in an amount from about 0.04 to about 0.1 wt % of total monomers in said blend.

13. A composition as claimed in claim 1, wherein said cyclic ureido monomer having the formula:

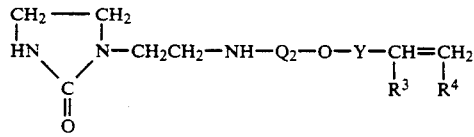

where

-continued

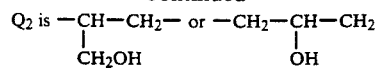

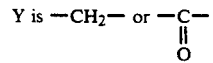

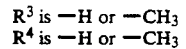

14. A composition as claimed in claim 13, wherein said cyclic ureido monomer has the formula:

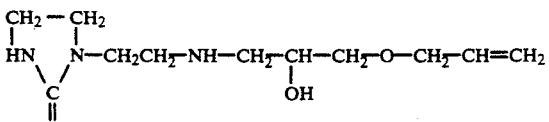

15. A composition as claimed in claim 1, wherein said first copolymer particles comprise vinyl acetate copolymer particles which contain about 80 to about 95 wt % of vinyl acetate; about 0.5 to about 1 wt % of acrylic acid; a monoalkyl maleate or sodium vinyl sulfonate; and the balance by weight of an acrylic acid ester selected from butyl acrylate and 2-ethyl hexyl acrylate.

16. A composition as claimed in claim 1, wherein said vinyl acetate copolymer dispersion contains about 0.4 to about 0.8 wt % of the total monomer in said vinyl acetate copolymers of a polymeric colloidal stabilizer selected from carboxymethyl cellulose, hydroxymethyl cellulose, hydroxyethyl cellulose and hydroxypropyl cellulose.

17. A composition as claimed in claim 1, wherein said first aqueous copolymer dispersion has a solids content of about 40 to about 70 wt % and said second aqueous copolymer dispersion has a solids content of about 40 to about 70 wt %.

18. A latex paint formulation containing the composition of claim 1.

* * * * *